(12) United States Patent
Jackson et al.

(10) Patent No.: US 12,364,947 B2
(45) Date of Patent: Jul. 22, 2025

(54) AERATION ROD

(71) Applicant: Raytheon Company, Arlington, VA (US)

(72) Inventors: William Jackson, Tucson, AZ (US); Raymond S. Lickson, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 823 days.

(21) Appl. No.: 17/532,278

(22) Filed: Nov. 22, 2021

(65) Prior Publication Data

US 2023/0158441 A1     May 25, 2023

(51) Int. Cl.
*B01D 53/04* (2006.01)
*B01D 53/26* (2006.01)
*F42C 99/00* (2006.01)

(52) U.S. Cl.
CPC ....... *B01D 53/0446* (2013.01); *B01D 53/261* (2013.01); *B01D 2257/80* (2013.01); *F42C 99/00* (2013.01)

(58) Field of Classification Search
CPC .. B01D 53/0446; B01D 53/04; B01D 53/261; B01D 2257/80; B01D 2253/102; B01D 2253/106; B01D 2253/108; B01D 2253/11; B01D 2258/06; B01D 2259/4533; B01D 2259/4566; B01D 2259/4575; B01D 53/0415; F42C 99/00
USPC .... 239/650, 689, 462, 553, 590; 95/90, 117; 96/108, 139, 147, 152
See application file for complete search history.

(56) References Cited

U.S. PATENT DOCUMENTS

| | | | |
|---|---|---|---|
| 2,225,990 A * | 12/1940 | Henry | F25B 43/003 138/41 |
| 4,999,034 A | 3/1991 | Mager et al. | |
| 5,902,381 A | 5/1999 | Golner et al. | |
| 6,422,729 B1 | 7/2002 | Rohrbach et al. | |
| 6,503,584 B1 * | 1/2003 | McAlister | F17C 1/02 220/560.04 |
| 6,709,493 B2 | 3/2004 | DeGuiseppi et al. | |

(Continued)

FOREIGN PATENT DOCUMENTS

| EP | 3393219 A1 | 10/2018 |
|---|---|---|
| KR | 101612726 B1 | 4/2016 |
| WO | 00/47932 A1 | 8/2000 |

OTHER PUBLICATIONS

International Search Report and Written Opinion issued for related International Application No. PCT/US2022/075308, mailed Dec. 5, 2023.

*Primary Examiner* — Frank M Lawrence, Jr.
(74) *Attorney, Agent, or Firm* — Schwegman Lundberg & Woessner, P.A.

(57) ABSTRACT

An aeration assembly includes an aeration rod extending along a longitudinal axis between a first end and a second end and having a plurality of longitudinal grooves extending along the longitudinal axis from the first end at least partially to the second end around at least a portion of a circumference of the aeration rod. The aeration assembly also includes an air-activated material adjacent the aeration rod at least along the plurality of longitudinal grooves. The plurality of longitudinal grooves are configured to distribute air from the first end of the aeration rod to the air-activated material adjacent the aeration rod.

20 Claims, 5 Drawing Sheets

(56) References Cited

U.S. PATENT DOCUMENTS

| | | | | |
|---|---|---|---|---|
| 7,712,605 B2 * | 5/2010 | Suzuki | ................ | F17C 11/005 |
| | | | | 165/157 |
| 2003/0133310 A1 | 7/2003 | VanDuyn et al. | | |
| 2013/0061751 A1 | 3/2013 | Martin et al. | | |
| 2016/0332111 A1 | 11/2016 | Ward, Jr. | | |
| 2019/0054417 A1 | 2/2019 | Vucic | | |
| 2019/0282945 A1 * | 9/2019 | Lu | ........................ | B01D 53/04 |

* cited by examiner

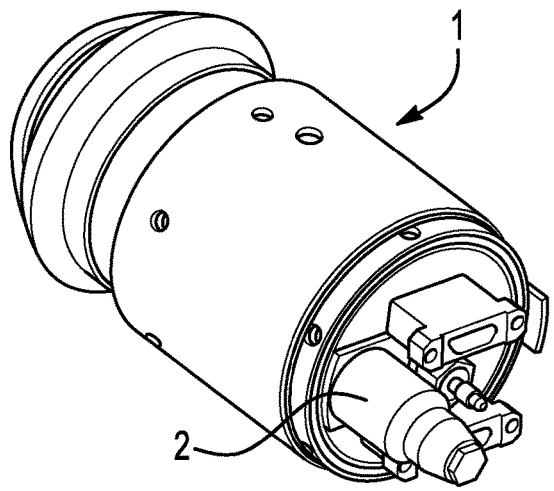
FIG. 1A
(CONVENTIONAL)
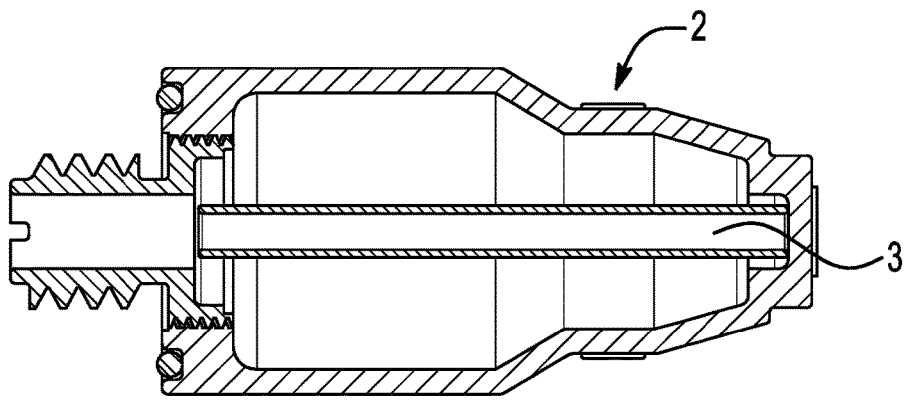
FIG. 1B
(CONVENTIONAL)
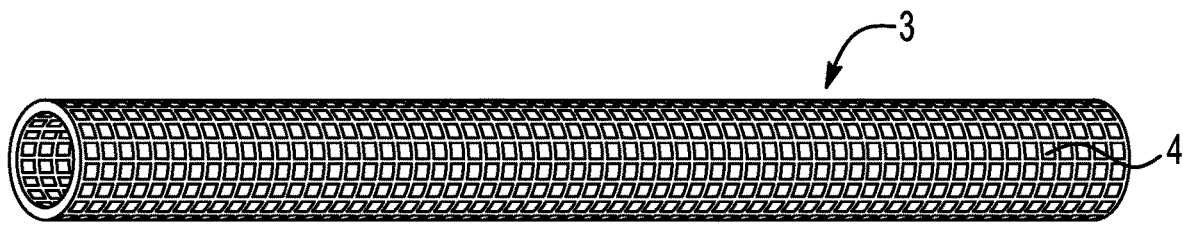
FIG. 1C
(CONVENTIONAL)

AERATION ROD

GOVERNMENT LICENSE RIGHTS

This disclosure was made with Government support under contract number N00024-18-C-5407, awarded by the United States Naval Sea Systems. The Government has certain rights in the invention.

TECHNICAL FIELD

The present disclosure relates generally to aeration assemblies and more particularly to aeration assemblies to distribute airflow to an air-activated material.

BACKGROUND

Air-activated material, such as desiccant material, may be used in a variety of applications. For example, desiccant material may be used in the medical industry, the automotive industry, the aerospace industry, and in various optical systems and technology. Other air-activated materials may also be used in these industries, such as air-activated explosive material in the aerospace industry. Air-activated material requires contact with air to perform its intended function. For example, desiccant material is intended to absorb moisture from the air and air-activated explosive material is intended to initiate upon contact with air.

Air-activated material may be contained in canisters. For example, desiccant material may be contained within a desiccant canister that is applied to a component or system that moisture is intended to be absorbed from. For example, FIG. 1A depicts a missile seeker 1 having a conventional desiccant canister 2 applied to a side thereof such that the desiccant contained within the desiccant canister 2 can absorb moisture from air within the missile seeker 1. A problem often associated with desiccant canisters like that depicted in FIG. 1A is the tendency for the desiccant material to "stall out." That is, in desiccant canisters having smaller package sizes and/or a particularly large length-to-diameter ratio, when desiccant material located closer to the source of air absorbs all of the moisture that it can, air is less likely to travel past the saturated desiccant material to the desiccant material located further from the source of air. Accordingly, the desiccant material within the desiccant canister prematurely stops absorbing moisture from the air, despite the desiccant material located further from the source of air still having capacity to do so.

To prevent this "stall out," aeration throughout the desiccant material contained within the desiccant canister is required to deliver air from the source of air to all of the desiccant material within the desiccant canister. With reference to FIGS. 1B-1C, prior attempts at such aeration have included disposing an aeration tube 3 having a plurality of small holes 4 formed in the thin walls thereof through the center of the desiccant canister 2 to provide a pathway for air to travel from the source of air to desiccant material located along the length of the desiccant canister 2, including the desiccant material located further from the source of air. These aeration tubes 3, however, have producibility limits and manufacturing tolerances that limit how small of a diameter such tubes 3 can have. Specifically, due to the thin and fragile nature of such tubes and the small holes 4 formed therein, many manufacturers are only able to reliably produce tubes having a lower diameter limit of around 0.187 inches (4.750 millimeters). Additionally, such tubes can be fragile due to the many number of holes drilled in the walls thereof. Furthermore, the holes in the walls of such tubes may become blocked by desiccant material, altogether blocking the passage of air therethrough.

SUMMARY

An improved aeration rod is described herein and is capable of being reliably produced with an outer diameter less than 0.187 inches (4.750 millimeters). This allows for more air-activated material (e.g., desiccant) to be provided within a smaller package housing for containing the air-activated material (e.g., desiccant canister), and therefore greater function performing capacity of the desiccant material within the housing (e.g., the moisture absorbing capability of the desiccant material within the desiccant canister). The aeration rod is configured to extend along a longitudinal axis between a first end and a second end and has a plurality of longitudinal grooves extending along the longitudinal axis. When at least partially disposed in the housing having an air-activated material contained therein, the plurality of longitudinal grooves are configured to distribute air from a source of air at the first end of the aeration rod at an opening of the housing to the air-activated material surrounding the aeration rod along a length of the longitudinal grooves within the housing. In this manner, suitable aeration may be provided within the housing such that air may be more fully distributed throughout the air-activated material, preventing premature "stall out" of the air-activated material.

The aeration rod disclosed herein may be easily fabricated using a variety of standard machining operations without the need for welding or drilling a series of holes into a thin-walled tube and may therefore be produced with a much smaller outer diameter than those previously used. Additionally, the aeration rod disclosed herein is sturdier than those previously described and is not as susceptible to damage from normal handling and installation. Due to the size and shape of the longitudinal grooves, the passage of air therethrough cannot be altogether blocked by air-activated material in the housing, therefore allowing for reliable and consistent aeration throughout the housing.

According to an aspect of this disclosure, an aeration assembly includes an aeration rod extending along a longitudinal axis between a first end and a second end and having a plurality of longitudinal grooves extending along the longitudinal axis from the first end at least partially to the second end around at least a portion of a circumference of the aeration rod. The aeration assembly also includes an air-activated material adjacent the aeration rod at least along the plurality of longitudinal grooves. The plurality of longitudinal grooves are configured to distribute air from the first end of the aeration rod to the air-activated material adjacent the aeration rod.

According to an embodiment of any paragraph(s) of this disclosure, the aeration assembly further includes a housing retaining the air-activated material and at least partially enclosing the aeration rod.

According to another embodiment of any paragraph(s) of this disclosure, the housing includes an opening at a first end of the housing and the aeration rod extends from the opening of the housing at least partially to a second end of the housing, opposite the first end of the housing such that air entering the opening of the housing distributes along the longitudinal grooves of the aeration rod to the air-activated material adjacent the aeration rod inside the housing.

According to another embodiment of any paragraph(s) of this disclosure, the plurality of longitudinal grooves extend along the longitudinal axis from the first end to the second end of the aeration rod.

According to another embodiment of any paragraph(s) of this disclosure, the plurality of longitudinal grooves are unequally spaced around the circumference of the aeration rod.

According to another embodiment of any paragraph(s) of this disclosure, the plurality of longitudinal grooves are equally spaced around the circumference of the aeration rod.

According to another embodiment of any paragraph(s) of this disclosure, the air-activated material includes a plurality of discrete spheres of air-activated material.

According to another embodiment of any paragraph(s) of this disclosure, each of the plurality of longitudinal grooves has a width extending in a circumferential direction of the aeration rod that is less than a diameter of each of the plurality of discrete spheres of the air-activated material.

According to another embodiment of any paragraph(s) of this disclosure, at least one of the plurality of longitudinal grooves has a tapered radial cross-section.

According to another embodiment of any paragraph(s) of this disclosure, at least one of the plurality of longitudinal grooves has a rectangular radial cross-section.

According to another embodiment of any paragraph(s) of this disclosure, at least one of the plurality of longitudinal grooves has a square radial cross-section.

According to another embodiment of any paragraph(s) of this disclosure, the aeration assembly further includes a helical groove helically extending around the circumference of the aeration rod along the longitudinal axis from the first end of the aeration rod at least partially to the second end of the aeration rod. The helical groove is configured to distribute air from the first end of the aeration rod to the air-activated material adjacent the aeration rod.

According to another embodiment of any paragraph(s) of this disclosure, the helical groove includes a thread angle in the range of 50 degrees to 70 degrees.

According to another embodiment of any paragraph(s) of this disclosure, the helical groove includes a thread pitch in the range of 80 threads per inch to 1.25 threads per inch.

According to another aspect of this disclosure, a method of distributing air to an air-activated material includes the step of providing an aeration rod extending along a longitudinal axis between a first end and a second end and including a plurality of longitudinal grooves extending along the longitudinal axis from the first end at least partially to the second end around at least a portion of a circumference of the aeration rod. The method also includes the step of disposing an air-activated material adjacent the aeration rod at least along the plurality of longitudinal grooves. The method also includes the step of distributing air from the first end of the aeration rod along the plurality of longitudinal grooves of the aeration rod to the air-activated material adjacent the aeration rod.

According to an embodiment of any paragraph(s) of this disclosure, the step of providing the aeration rod includes disposing the aeration rod in a housing and the step of disposing the air-activated material adjacent the aeration rod includes at least partially filling the housing with the air-activated material.

According to another embodiment of any paragraph(s) of this disclosure, the aeration rod further includes a helical groove helically extending around the circumference of the aeration rod along the longitudinal axis from the first end of the aeration rod at least partially to the second end of the aeration rod. The method further includes the step of distributing air from the first end of the aeration rod along the helical groove of the aeration rod to the air-activated material adjacent the aeration rod.

According to another embodiment of any paragraph(s) of this disclosure, providing the aeration rod includes fabricating the plurality of longitudinal grooves extending along the longitudinal axis from the first end at least partially to the second end around at least a portion of a circumference of the aeration rod.

According to another embodiment of any paragraph(s) of this disclosure, the method further includes fabricating the helical groove helically extending around the circumference of the aeration rod along the longitudinal axis from the first end of the aeration rod at least partially to the second end of the aeration rod.

According to another embodiment of any paragraph(s) of this disclosure, at least one of the fabricating the plurality of longitudinal grooves and the fabricating the helical groove includes at least one of injection molding, extruding, standard machining, and additive manufacturing.

The following description and the annexed drawings set forth in detail certain illustrative embodiments described in this disclosure. These embodiments are indicative, however, of but a few of the various ways in which the principles of this disclosure may be employed. Other objects, advantages and novel features will become apparent from the following detailed description when considered in conjunction with the drawings.

BRIEF DESCRIPTION OF DRAWINGS

The annexed drawings show various aspects of the disclosure.

FIG. 1A is a perspective view of a conventional desiccant canister attached to a missile component.

FIG. 1B is a perspective view of a conventional aeration system using a conventional aeration tube.

FIG. 1C is a perspective view of the conventional aeration tube of FIG. 1B.

DETAILED DESCRIPTION

According to a general embodiment, an aeration assembly includes an aeration rod extending along a longitudinal axis between a first end and a second end. The aeration rod has a plurality of longitudinal grooves extending along the longitudinal axis from the first end at least partially to the second end around at least a portion of a circumference of the aeration rod. An air-activated material is disposed adjacent the aeration rod at least along the plurality of longitudinal grooves such that the plurality of longitudinal grooves are configured to distribute air from the first end of the aeration rod to the air-activated material adjacent the aeration rod. The aeration assembly may include a housing configured to contain the air-activated material and at least partially contain the aeration rod. The housing may include an opening at a first end of the housing from which the aeration rod extends into the housing such that air may be distributed from the opening of the housing at least partially to a second end of the housing, along the plurality of longitudinal grooves of the aeration rod, and therefore to the air-activated material adjacent the plurality of longitudinal grooves. In this manner, air may reliably reach the air-activated material located along the length of the housing, not just the air-activated material located closest to the opening of the housing.

Figure 2:
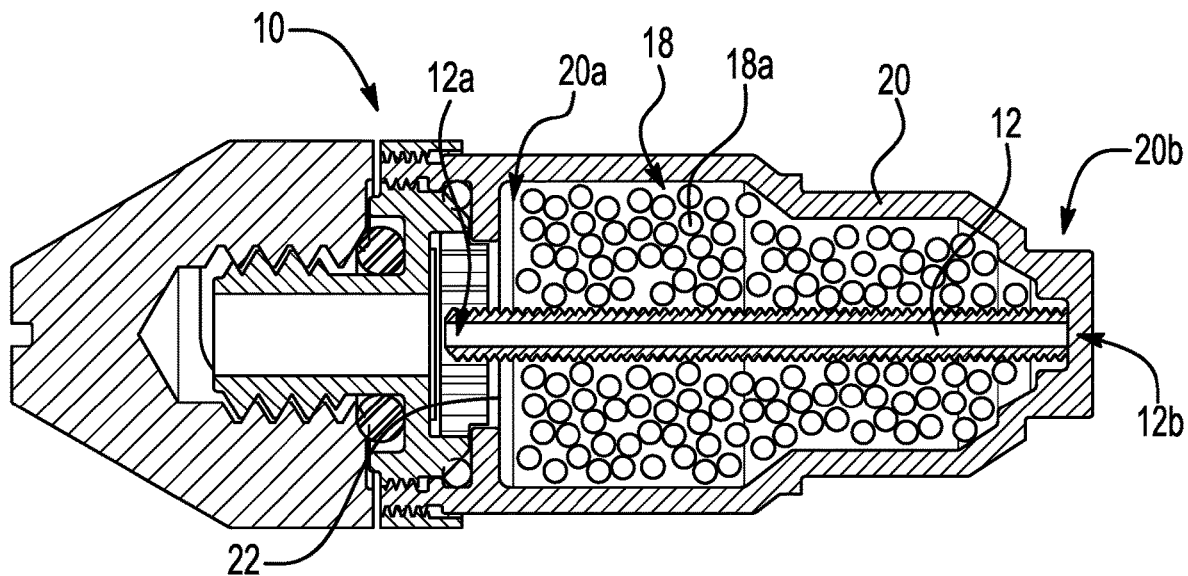
FIG. 2 is a longitudinal cross-sectional view of an aeration assembly.
Figure 3:
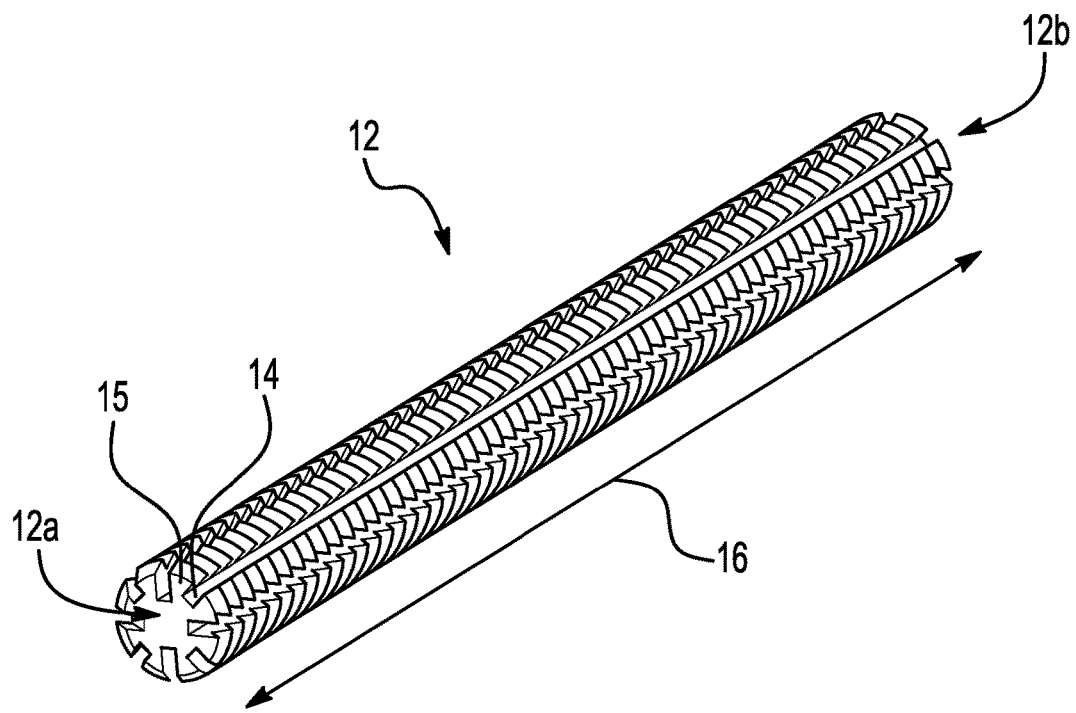
FIG. 3 is a perspective view of an aeration rod in the aeration assembly of FIG. 2.

Turning now to the figures and initially to FIG. 2, an aeration assembly 10 is depicted. The aeration assembly 10 includes an aeration rod 12. The aeration rod, depicted in isolation in FIG. 3, includes a plurality of longitudinal grooves 14 extending from a first end 12a of the aeration rod 12 at least partially to a second end 12b of the aeration rod 12 along a longitudinal axis 16. The plurality of longitudinal grooves 14 define longitudinal projections 15 between each of the plurality of longitudinal grooves 14. As depicted, the plurality of longitudinal grooves 14 and the longitudinal projections 15 may extend from the first end 12a of the aeration rod 12 completely to the second end 12b of the aeration rod 12. The plurality of longitudinal grooves 14 extend around at least a portion of a circumference of the aeration rod 12. As depicted, the plurality of longitudinal grooves 14 may extend around an entirety of the circumference of the aeration rod 12. The plurality of longitudinal grooves 14 may be equally spaced around the circumference of the aeration rod 12. Alternatively, the plurality of longitudinal grooves 14 may be unequally spaced around the circumference of the aeration rod 12. The aeration rod 12 may have an outer diameter in the range of 0.060 inches (1.524 millimeters) to 6.0 inches (152.4 millimeters), 0.100 inches (2.54 millimeters) to 5.0 inches (127.0 millimeters), 0.500 inches (12.70 millimeters) to 4.0 inches (101.60 millimeters), or 1.0 inches (25.40 millimeters) to 3.0 inches (76.20 millimeters). The aeration rod 12 may have a length in the longitudinal direction 16 in the range of 0.250 inches (6.35 millimeters) to 12.0 inches (304.8 millimeters), 0.50 inches (12.70 millimeters) to 10.0 inches (254 millimeters), 1.0 inches (25.40 millimeters) to 8.0 inches (203.20 millimeters), or 2.0 inches (50.80 millimeters to 6.0 inches (152.40 millimeters). It will be understood, however, that the outer diameter and length of the aeration rod 12 described above are provided as non-limiting examples, and that the dimensions of the aeration rod 12 may vary based on the particular application to which it is applied. For example, the aeration rod 12 may have an outer diameter greater than 6.0 inches (152.40 millimeters) and a length longer than 12.0 inches (304.8 millimeters). The aeration rod 12 may be made of any variety of materials, including metal or plastic, as non-limiting examples.

Referring back to FIG. 2, the aeration assembly 10 includes an air-activated material 18 adjacent to the aeration rod 12 at least along the plurality of longitudinal grooves 14. The air-activated material 18 is a material that requires contact with air to perform its intended function. For example, the air-activated material 18 may include a desiccant material, which requires contact with air to absorb moisture from the air. As non-limiting examples, the desiccant material may be at least one of a molecular sieve, silica gel beads, bentonite clay, and carbon. As another example, the air-activated material 18 may be an air-activated explosive material, which requires contact with air to initiate. It is understood, however, that the air-activated material 18 may be any other material that requires contact with air to perform its intended function.

The air-activated material 18 may include, for example, a plurality of discrete particles 18a of air-activated material. As depicted, the plurality of discrete particles 18a may have a spherical shape. It is understood, however, that the plurality of discrete particles 18a may have another suitable 3-dimensional shape. The aeration assembly 10 may include a housing 20 configured to contain the air-activated material 18 and at least partially contain the aeration rod 12. The housing 20 may have an opening 22 at a first end 20a of the housing 20 with the aeration rod 12 extending from the opening 22 of the housing 20 at least partially to a second end 20b of the housing 20 opposite the first end 20a of the housing 20 such that air entering the opening 22 of the housing 20 can distribute along the longitudinal grooves 14 of the aeration rod 12 to the air-activated material 18 adjacent the plurality of longitudinal grooves 14 of the aeration rod 12 inside the housing 20. Specifically, the housing 20 may be at least partially filled with the air-activated material 18, the air-activated material 18 being arranged adjacent the aeration rod 12 within the housing 20 at least along the plurality of longitudinal grooves 14. The air-activated material 18 may at least partially or completely surround the aeration rod 12 within the housing. For example, as depicted, the aeration rod 12 may be disposed in a center of the housing 20, such that the air-activated material 18 surrounds the aeration rod 12 around the entire circumference of the aeration rod 12 along at least a portion of the aeration rod 12 in the longitudinal axis 16.

Figure 4A:
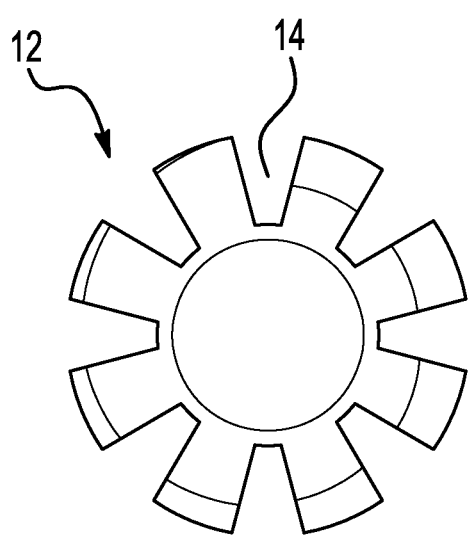
FIGS. 4A and 4B are radial cross-sectional views of various embodiments of the aeration assembly of FIG. 2.
Figure 4B:
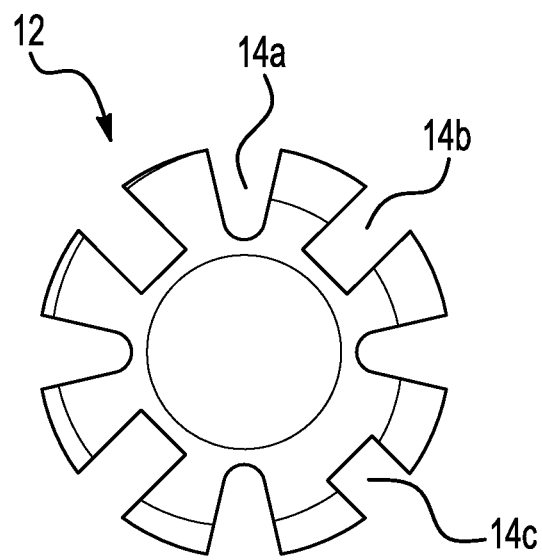

Turning to FIGS. 4A and 4B, the plurality of longitudinal grooves 14 may have any one of a variety of radial cross-sectional shapes, or may include a combination of different radial cross-sectional shapes. For example, as depicted in FIG. 4A, each of the plurality of longitudinal grooves 14 may have a tapered radial cross-section. The tapered radial cross-section may have a squared radially innermost end, as depicted, or may alternatively have a rounded radially innermost end. Alternatively, each of the plurality of longitudinal grooves 14 may have a radial cross-section that is rectangular (see longitudinal groove 14b in FIG. 4B) or square (see longitudinal groove 14c in FIG. 4B) in shape. As another example, depicted in FIG. 4B, the plurality of longitudinal grooves 14 may include at least one longitudinal groove 14a having a first shaped radial cross-section and at least one other longitudinal groove 14b having a second shaped radial cross-section. As depicted in FIG. 4B, the first shaped radial cross-section and the second shaped radial cross-section may be at least one of a rectangular (longitudinal groove 14b in FIG. 4B), square (longitudinal groove 14c in FIG. 4B), and/or tapered radial cross-section shape, having either a squared radially innermost end (longitudinal groove 14 in FIG. 4A) or rounded radially innermost end (see longitudinal groove 14a in FIG. 4B). The above described and depicted shapes of the radial cross sections of the longitudinal grooves 14 are provided as non-limiting examples, and it is understood that other radial cross-section shapes may be applicable to the longitudinal grooves 14 of the aeration rod.

Figure 5:
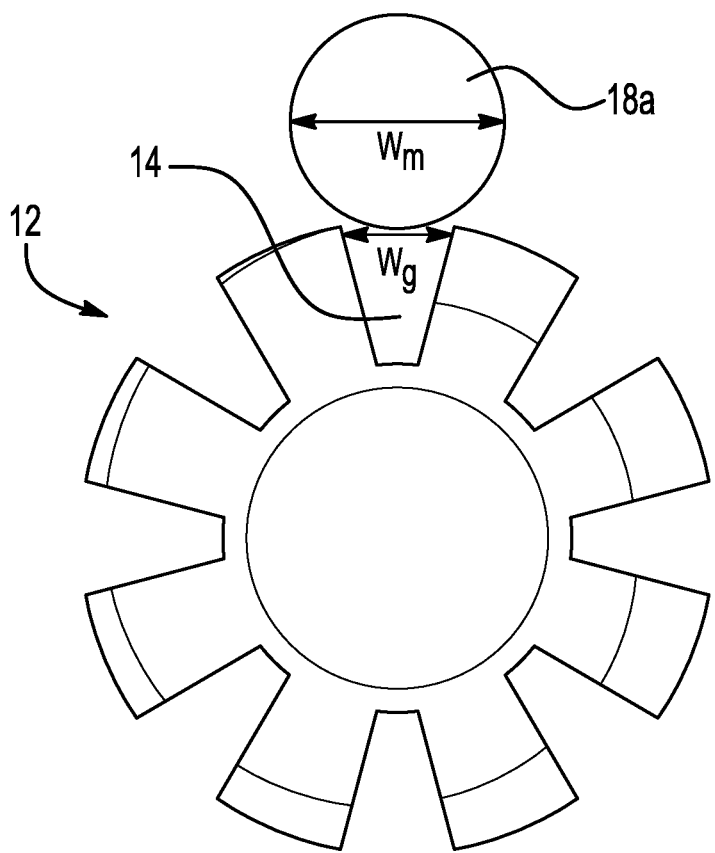
FIG. 5 is a radial cross-sectional view of the aeration rod in the aeration assembly of FIG. 2.

With reference to FIG. 5, each of the plurality of longitudinal grooves 14 has a radially outermost width $W_g$ extending perpendicular to the longitudinal axis 16 that is less than a diameter $D_m$ or maximum width $W_m$ of each of the plurality of discrete particles 18a of the air-activated material 18. As non-limiting examples, the radially outermost width $W_g$ may be in the range of 0.008 inches (0.203 millimeters) to 0.500 inches (12.7 millimeters), while the diameter $D_m$ or maximum width $W_m$ of each of the plurality of discrete particles 18a may be in the range of 0.010 inches (0.254 millimeters) to 0.125 inches (3.18 millimeters). It is understood, however, that the radially outermost width $W_g$ and the diameter $D_m$ or maximum width $W_m$ of each of the plurality of discrete particles 18a may vary based on the particular application to which they are applied. For example, the radially outermost width $W_g$ may be greater than 0.500 inches (12.7 millimeters) and the diameter $D_m$ or maximum width $W_m$ of each of the plurality of discrete particles 18a may be greater than 0.125 inches (3.18 millimeters). In this manner, each of the plurality of discrete particles 18a of the air-activated material 18 are prevented from entering and blocking any portion of the plurality of longitudinal grooves 14 along the longitudinal axis 16. Accordingly, air may reliably be distributed along an entire length of the plurality of longitudinal grooves 14 to the air-activated material 18 adjacent the entire length of the plurality of longitudinal grooves 14.

Figure 6:
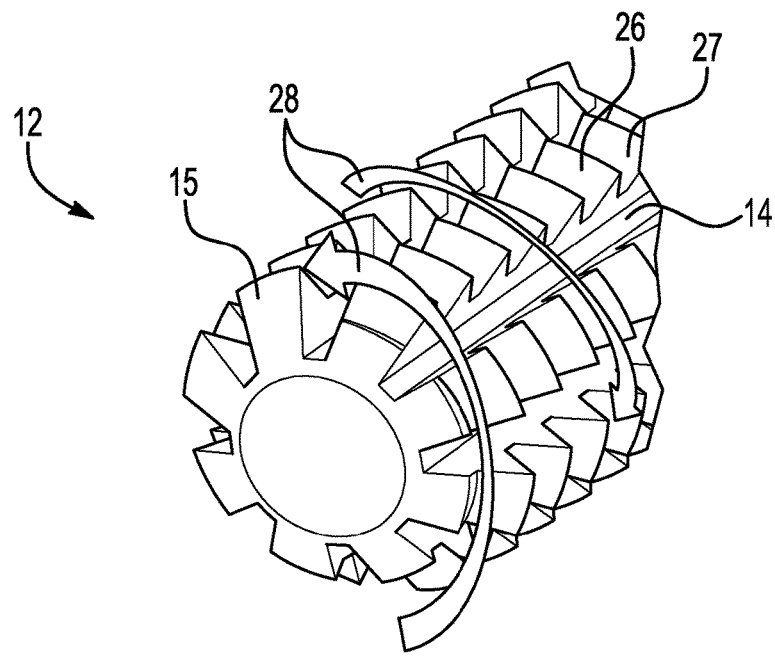
FIG. 6 is a partial perspective view of the aeration rod in the aeration assembly of FIG. 2.

With reference to FIG. 6, the aeration rod 12 of the aeration assembly 10 may optionally include a helical groove 26 helically extending around the circumference of the aeration rod 12 along the longitudinal axis 16 from the first end 12a of the aeration rod 12 at least partially to the second end 12b of the aeration rod 12. For example, the helical groove 26 may extend from the first end 12a of the aeration rod 12 completely to the second end 12b of the aeration rod 12. The helical groove 26 defines a helical projection 27 also helically extending around the circumference of the aeration rod 12 along the longitudinal axis 16. The helical groove 26, therefore, is configured to distribute air from the first end 12a of the aeration rod 12 at least partially to the second end 12b of the aeration rod 12 along the helical groove 26, as depicted by the arrows 28 in FIG. 6. When provided in addition to the plurality of longitudinal grooves 14 and longitudinal projections 15, the helical groove 26 and helical projection 27 intersect each of the plurality of longitudinal grooves 14 and longitudinal projections 15. The helical groove 26 provides an additional pathway for air to distribute from the first end 12a of the aeration rod 12 at least partially to the second end 12b of the aeration rod 12, particularly where the plurality of longitudinal grooves 14 are not provided. Therefore, the helical groove 26 is configured to distribute air from the first end 12a of the aeration rod 12 not only directly to the air-activate material 18 adjacent the plurality of longitudinal grooves 14, but also directly to the air-activated material 18 adjacent the helical groove 26. In this manner, air may be more reliably distributed to more of the air-activated material 18 adjacent the aeration rod 12 than that which is reached by the plurality of longitudinal grooves 14, alone. The helical groove 26 may have a thread angle in the range of 50 degrees to 70 degrees or 55 degrees 60 degrees. Additionally, the helical groove 26 may have a thread pitch in the range of 80 threads per inch to 1.25 threads per inch. It is understood, however, that the above-described thread angle and thread pitch of the helical groove 26 are provided as non-limiting examples and that any other suitable thread angle and thread pitch may be applied to the helical groove 26.

Figure 7:
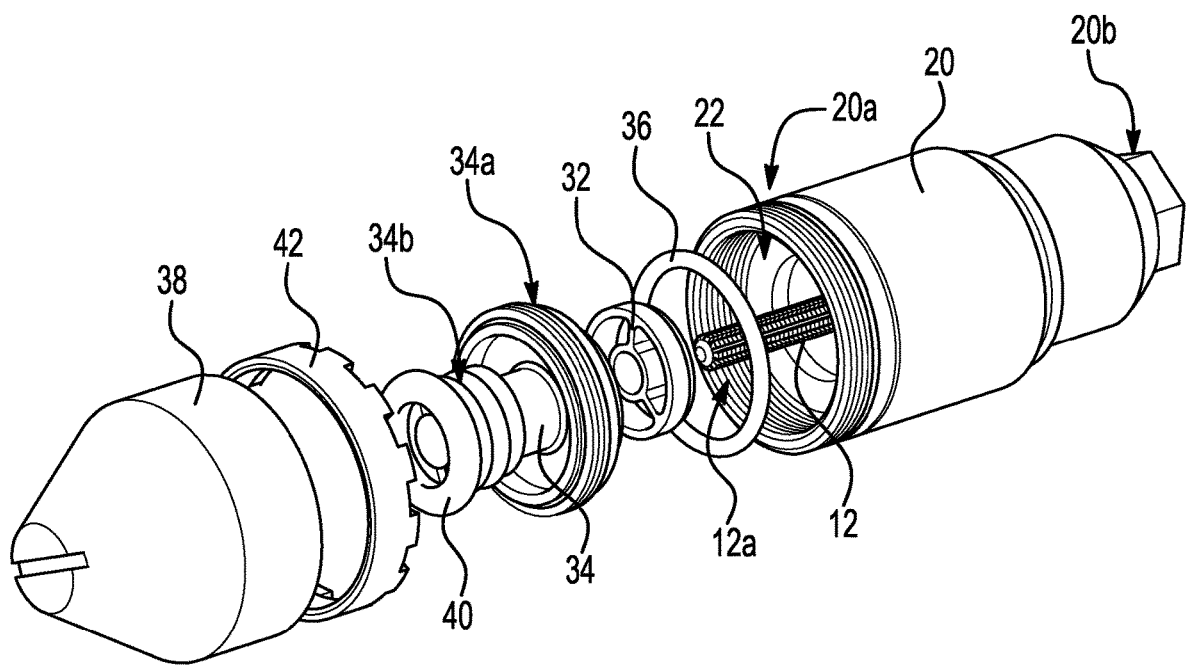
FIG. 7 is an exploded perspective view of the aeration assembly of FIG. 2.

With reference to FIG. 7, the aeration system 10 may be provided in a compact aeration assembly package 30 for handling and transport of the aeration assembly 10. The aeration assembly 30 includes the aeration system 10, including the housing 20 and the aeration rod 12 described above. The first end 12a of the aeration rod 12 is configured to extend beyond the opening 22 of the housing 20. The aeration assembly package 30 includes an aeration rod stabilizer 32 configured to stabilize the first end 12a of the aeration rod 12 that extends outside of the housing 20 beyond the opening 22 of the housing. The aeration rod stabilizer 32 includes a center hole through which the first end 12a of the aeration rod 12 extends and a plurality of apertures through which the air-activated material 18 may be filled into the housing 20.

The aeration assembly package 30 also includes a threaded interface member 34 having a first threaded end 34a and a second threaded end 34b. The first threaded end 34a of the threaded interface member 34 is configured to mate with a threaded portion of the housing 20 around the opening of the housing 22 to secure the aeration rod stabilizer 32 in place. A first sealing member 36 may be provided between the threaded interface member 34 and the first end 20a of the housing to effectively seal the interface between the threaded interface member 34 and the housing 20 when mated together. The second threaded end 34b of the threaded interface member 34 is configured to mate with a storage cap 38. When the storage cap 38 is removed, the second threaded end 34b of the threaded interface member 34 is configured to mate with an external component for which the aeration assembly 10 is configured to be applied. A second sealing member 40 may be provided between the threaded interface member 34 and the storage cap 38 to effectively seal the interface between the threaded interface member 34 and the storage cap 38 when mated together. The first sealing member 36 and the second sealing member 40 may be, for example, an O-ring. Additionally, a locking collar 42 may be provided on an exterior of the threaded portion of the housing 20 around the opening of the housing 22.

Figure 8:
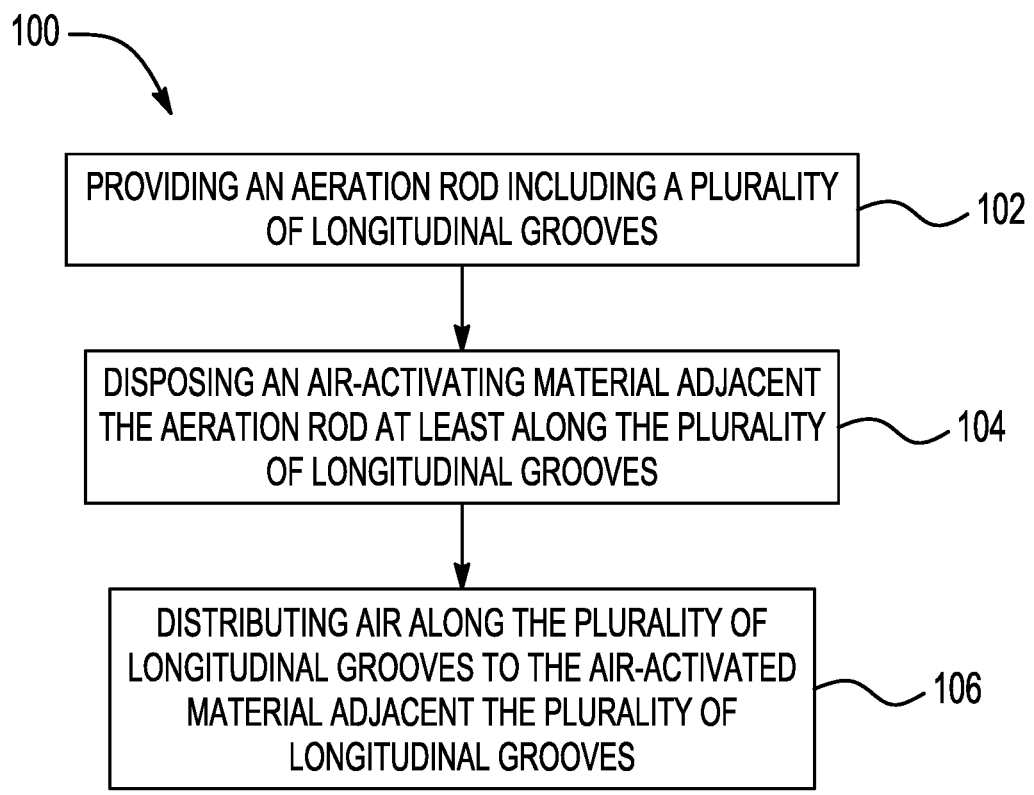
FIG. 8 is a flowchart of a method of distributing air to an air-activated material.

With reference to FIG. 8, a method 100 of distributing air to an air-activated material is depicted. The method 100 includes a step 102 of providing an aeration rod extending along a longitudinal axis between a first end and a second end. The aeration rod includes a plurality of longitudinal grooves extending along the longitudinal axis from the first end at least partially to the second end around at least a portion of a circumference of the aeration rod. The aeration rod may be the same as that described above with reference to FIGS. 2-6. Accordingly, the plurality of longitudinal grooves may extend along the longitudinal axis from the first end completely to the second end, and may extend around an entire circumference of the aeration rod. The plurality of longitudinal grooves may be equally or unequally spaced around the circumference of the aeration rod, as previously described.

The method 100 then includes a step 104 of disposing an air-activated material adjacent the aeration rod at least along the plurality of longitudinal grooves. The air-activated material may be the same as any of those described above with reference to FIGS. 2-6. Accordingly, the air-activated material may include a plurality of discrete air-activated particles having a diameter or maximum width that is greater than a radially outermost width of a radial cross-section of each of the plurality of longitudinal grooves of the aeration rod, as previously described. The method 100 then includes a step 106 of distributing air from the first end of the aeration rod along the plurality of longitudinal grooves of the aeration rod to the air-activated material adjacent the plurality of longitudinal grooves.

The step 102 of providing the aeration rod may include a step of fabricating the plurality of longitudinal grooves extending along the longitudinal axis from the first end at least partially to the second end around at least a portion of a circumference of the aeration rod. The step 102 of providing the aeration rod may also include disposing the aeration rod in a housing. For example, the housing may be the same as that described above with reference to FIG. 2, in particular. The step 104 of disposing the air-activated material adjacent the aeration rod may therefore include at least partially filling the housing with the air-activated material.

As described above with reference to FIG. 6, in particular, the aeration rod may further include a helical groove helically extending around the circumference of the aeration rod along the longitudinal axis from the first end of the aeration rod at least partially to the second end of the aeration rod. The method may therefore further include a step of distributing air from the first end of the aeration rod along the helical groove of the aeration rod to the air-activated material adjacent the aeration rod. Accordingly, the step 102 of providing the aeration rod may additionally include a step of fabricating the helical groove helically extending around the circumference of the aeration rod along the longitudinal axis from the first end of the aeration rod at least partially to the second end of the aeration rod. Alternatively, the step 102 of providing the aeration rod may include providing a threaded rod having the helical groove pre-fabricated thereon. At least one of the step of fabricating the plurality of longitudinal grooves and the step of fabricating the helical groove may include at least one of plastic or metal type injection molding, extruding, standard machining (for example, single point turning or using a die to cut the threads), and additive manufacturing (for example, 3-D printing).

Although the above disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:

1. An aeration assembly, comprising:
    an aeration rod extending along a longitudinal axis between a first end and a second end and having a plurality of longitudinal grooves extending along the longitudinal axis from the first end at least partially to the second end around at least a portion of a circumference of the aeration rod; and
    an air-activated material adjacent the aeration rod at least along the plurality of longitudinal grooves;
    wherein the plurality of longitudinal grooves are configured to distribute air from the first end of the aeration rod to the air-activated material adjacent the aeration rod.

2. The aeration assembly according to claim 1, further comprising a housing retaining the air-activated material and at least partially enclosing the aeration rod.

3. The aeration assembly according to claim 2, wherein the housing includes an opening at a first end of the housing and the aeration rod extends from the opening of the housing at least partially to a second end of the housing, opposite the first end of the housing such that air entering the opening of the housing distributes along the longitudinal grooves of the aeration rod to the air-activated material adjacent the aeration rod inside the housing.

4. The aeration assembly according to claim 1, wherein the plurality of longitudinal grooves extend along the longitudinal axis from the first end to the second end of the aeration rod.

5. The aeration assembly according to claim 1, wherein the plurality of longitudinal grooves are unequally spaced around the circumference of the aeration rod.

6. The aeration assembly according to claim 1, wherein the plurality of longitudinal grooves are equally spaced around the circumference of the aeration rod.

7. The aeration assembly according to claim 1, wherein the air-activated material includes a plurality of discrete spheres of air-activated material.

8. The aeration assembly according to claim 7, wherein each of the plurality of longitudinal grooves has a width extending in a circumferential direction of the aeration rod that is less than a diameter of each of the plurality of discrete spheres of the air-activated material.

9. The aeration assembly according to claim 1, wherein at least one of the plurality of longitudinal grooves has a tapered radial cross-section.

10. The aeration assembly according to claim 1, wherein at least one of the plurality of longitudinal grooves has a rectangular radial cross-section.

11. The aeration assembly according to claim 1, wherein at least one of the plurality of longitudinal grooves has a square radial cross-section.

12. The aeration assembly according to claim 1, further comprising a helical groove helically extending around the circumference of the aeration rod along the longitudinal axis from the first end of the aeration rod at least partially to the second end of the aeration rod, wherein the helical groove is configured to distribute air from the first end of the aeration rod to the air-activated material adjacent the aeration rod.

13. The aeration assembly according to claim 12, wherein the helical groove includes a thread angle in the range of 50 degrees to 70 degrees.

14. The aeration assembly according to claim 12, wherein the helical groove includes a thread pitch in the range of 80 threads per inch to 1.25 threads per inch.

15. A method of distributing air to an air-activated material, the method comprising the steps of:
    providing an aeration rod extending along a longitudinal axis between a first end and a second end and including a plurality of longitudinal grooves extending along the longitudinal axis from the first end at least partially to the second end around at least a portion of a circumference of the aeration rod;
    disposing an air-activated material adjacent the aeration rod at least along the plurality of longitudinal grooves; and
    distributing air from the first end of the aeration rod along the plurality of longitudinal grooves of the aeration rod to the air-activated material adjacent the aeration rod.

16. The method according to claim 15, wherein the step of providing the aeration rod includes disposing the aeration rod in a housing and wherein the step of disposing the air-activated material adjacent the aeration rod includes at least partially filling the housing with the air-activated material.

17. The method according to claim 15, wherein the aeration rod further includes a helical groove helically extending around the circumference of the aeration rod along the longitudinal axis from the first end of the aeration rod at least partially to the second end of the aeration rod, the method further comprising the step of distributing air from the first end of the aeration rod along the helical groove of the aeration rod to the air-activated material adjacent the aeration rod.

18. The method according to claim 17, wherein providing the aeration rod includes fabricating the plurality of longitudinal grooves extending along the longitudinal axis from the first end at least partially to the second end around at least a portion of a circumference of the aeration rod.

19. The method according to claim 18, further including fabricating the helical groove helically extending around the circumference of the aeration rod along the longitudinal axis from the first end of the aeration rod at least partially to the second end of the aeration rod.

20. The method according to claim 19, wherein at least one of the fabricating the plurality of longitudinal grooves and the fabricating the helical groove includes at least one of injection molding, extruding, standard machining, and additive manufacturing.

* * * * *

UNITED STATES PATENT AND TRADEMARK OFFICE
CERTIFICATE OF CORRECTION

| | | |
|---|---|---|
| PATENT NO. | : 12,364,947 B2 | Page 1 of 1 |
| APPLICATION NO. | : 17/532278 | |
| DATED | : July 22, 2025 | |
| INVENTOR(S) | : Jackson et al. | |

It is certified that error appears in the above-identified patent and that said Letters Patent is hereby corrected as shown below:

In the Specification

In Column 8, Line 15, delete "22" and insert --20-- therefor

In Column 8, Line 33, delete "22." and insert --20.-- therefor

Signed and Sealed this
Twenty-seventh Day of January, 2026

John A. Squires
*Director of the United States Patent and Trademark Office*